United States Patent
Gan et al.

(10) Patent No.: US 6,737,191 B2
(45) Date of Patent: May 18, 2004

(54) DOUBLE CURRENT COLLECTOR NEGATIVE ELECTRODE DESIGN FOR ALKALI METAL ION ELECTROCHEMICAL CELLS

(75) Inventors: Hong Gan, East Amherst, NY (US); Robert S. Rubino, Williamsville, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 264 days.

(21) Appl. No.: 10/008,977

(22) Filed: Nov. 8, 2001

(65) Prior Publication Data

US 2002/0061446 A1 May 23, 2002

Related U.S. Application Data

(60) Provisional application No. 60/249,688, filed on Nov. 17, 2000.

(51) Int. Cl.$^7$ .................................................. H01M 4/00
(52) U.S. Cl. .................. 429/128; 429/231.8; 429/231.4; 429/231.1; 429/231.2; 429/231.3; 429/231.5; 429/231.7; 429/219; 429/220; 429/221; 429/224; 429/232; 429/217; 429/245; 429/330; 429/332
(58) Field of Search .................... 429/231.8, 231.95, 429/231.9, 219, 220, 231.5, 224, 231.7, 128, 231.4, 231.1, 231.2, 231.3, 221, 232, 217, 245, 330, 332

(56) References Cited

U.S. PATENT DOCUMENTS

| | | |
|---|---|---|
| 3,520,729 A | 7/1970 | Voss et al. |
| 4,161,063 A | 7/1979 | Goebel et al. |
| 4,292,357 A | 9/1981 | Erisman et al. |
| 4,324,828 A | 4/1982 | Ebato et al. |
| 4,409,730 A | 10/1983 | Goebel |
| 4,439,916 A | 4/1984 | Faber |
| 5,180,642 A | 1/1993 | Weiss et al. |
| 5,571,636 A | 11/1996 | Ohta et al. |
| 5,582,935 A | 12/1996 | Dasgupta et al. |
| 5,601,951 A * | 2/1997 | Johnson et al. .............. 429/346 |
| 5,639,568 A | 6/1997 | Pedicini et al. |
| 5,658,694 A | 8/1997 | Charkey |
| 5,667,916 A | 9/1997 | Ebel et al. |
| 5,670,276 A | 9/1997 | Takeuchi et al. |
| 5,716,422 A | 2/1998 | Muffoletto et al. |
| 5,744,258 A | 4/1998 | Bai et al. |
| 5,863,676 A | 1/1999 | Charkey et al. |
| 5,993,999 A | 11/1999 | Rivers et al. |
| 6,506,524 B1 * | 1/2003 | McMillan et al. ........... 429/324 |

* cited by examiner

Primary Examiner—Laura Weiner
(74) Attorney, Agent, or Firm—Michael F. Saclise

(57) ABSTRACT

A new sandwich negative electrode design for a secondary cell is provided comprising a "sacrificial" alkali metal along with a carbonaceous anode material. In the case of a hard carbon anode material, the sacrificial alkali metal is preferably lithium and is sized to compensate for the initial irreversible capacity of this anode material. Upon activating the cells, the lithium metal automatically intercalates into the hard carbon anode material. That way, the sacrificial lithium is consumed and compensates for the generally unacceptable irreversible capacity of hard carbon. The superior cycling longevity of hard carbon now provides a secondary cell of extended use beyond that know for conventional secondary cells having only graphitic anode materials.

29 Claims, No Drawings

DOUBLE CURRENT COLLECTOR NEGATIVE ELECTRODE DESIGN FOR ALKALI METAL ION ELECTROCHEMICAL CELLS

CROSS REFERENCE TO RELATED APPLICATION

This application claims priority based on provisional application Ser. No. 60/249,688, filed Nov. 17, 2000.

BACKGROUND OF THE INVENTION

This invention relates to the conversion of chemical energy to electrical energy. In particular, the present invention relates to a new negative electrode design having an anode active material sandwiched between two current collectors with an anode material capable of intercalating and de-intercalating the anode active material in contact with the opposite sides of the current collectors. The present negative electrode design is useful for high discharge rate secondary cells, such as those powering an implantable medical device.

SUMMARY OF THE INVENTION

Secondary electrochemical cells are typically built in a discharged state having a negative electrode of a carbonaceous material and a positive electrode of a lithiated material. A reverse potential is then applied to the cell to cause lithium ions at the positive electrode to migrate through the electrolyte and intercalate into the carbonaceous anode material. The cell is then discharged in a normal manner.

Graphitic forms of carbon are generally preferred for the anode material because they exhibit acceptable cycling capability and good reversible capacity, especially during initial change and discharge cycles. While graphite is commonly used, there are other carbonaceous materials which have better reversible capacities. One in particular is hard carbon. This material has excellent cycling characteristics, but suffers from a relatively large initial irreversible capacity.

Therefore, according to the present invention, a secondary cell is constructed having a "sacrificial" piece of alkali metal as a portion of the negative electrode along with an alkali metal intercalation and de-intercalation material, such as a carbonaceous anode material. In the case of hard carbon, the sacrificial alkali metal is preferably a piece of lithium metal and is sized to compensate for the initial irreversible capacity of this anode material. After the cell is activated with an electrolyte, the lithium metal automatically intercalates into the hard carbon anode material. That way, the sacrificial lithium metal compensates for the generally unacceptable irreversible capacity of hard carbon. The superior cycling longevity of hard carbon now provides a secondary cell of extended use beyond that known for conventional secondary cells having only graphitic anode materials.

Accordingly, one object of the present invention is to improve the cycling performance of lithium ion cells by providing a new concept in negative electrode design. Further objects of this invention include providing a cell design for improving the capacity and utilization efficiency of lithium-containing secondary cells.

These and other objects of the present invention will become increasingly more apparent to those skilled in the art by reference to the following description.

DETAILED DESCRIPTION OF THE PREFERRED EMBODIMENTS

The electrochemical cell of the present invention is of a secondary, rechargeable chemistry. The cell comprises an anode active metal selected from Groups IA, IIA and IIIB of the Periodic Table of the Elements, including lithium, sodium, potassium, etc.

In conventional secondary electrochemical systems, the anode or negative electrode comprises an anode material capable of intercalating and de-intercalating the anode active material, such as the preferred alkali metal lithium. Typically, the anode material of the negative electrode comprises any of the various forms of carbon (e.g., coke, graphite, acetylene black, carbon black, glassy carbon, etc.) which are capable of reversibly retaining the lithium species. Graphite is particularly preferred in conventional secondary cells. "Hairy carbon" is another particularly preferred conventional material due to its relatively high lithium-retention capacity. "Hairy carbon" is a material described in U.S. Pat. No. 5,443,928 to Takeuchi et al., which is assigned to the assignee of the present invention and incorporated herein by reference.

However it is known that graphitic forms of carbon do not possess as high of a reversible capacity as hard carbon. Hard carbon, defined as non-graphitizable carbon material, has two to four times as much reversible capacity as graphite. Hard carbon is typically prepared by firing an appropriate organic precursor to temperatures between 700° C. and 1,200° C. Hard carbons typically exhibit excellent cyclability and high reversible capacity. The current state of the art, i.e., graphite, is theoretically limited to a capacity of 372 mAh/g, while hard carbons exhibit capacities of 400 mAh/g or more. This means that a secondary cell built with hard carbon as the anode material can be charged and discharged, or cycled, two to four times as much as a secondary cell built with a graphitic form of anode material. The improvement in cycle life is based on the dimensional stability of hard carbon during lithium intercalation and de-intercalation. This means that a secondary cell built with hard carbon as the anode material has potentially higher capacity than a secondary cell built with a graphitic form of anode material.

On the other hand, the main reason hard carbon is not used more frequently in secondary cells is because it suffers from large initial cycle irreversible capacity relative to graphite. This irreversible capacity must be compensated for by the addition of cathode active material to the cell which, in turn, lowers the cell's capacity.

For this reason, the negative electrode of the present secondary cells is built in a double screen configuration having a "sacrificial" piece of alkali metal, preferably lithium, sandwiched between two current collectors. A carbonaceous material or a material capable of intercalation and de-intercalation of the alkali metal contacts the opposite side of at least one, and preferably both, of the current collectors. The purpose of the sacrificial alkali metal is to compensate for the irreversible capacity of the intercalation and de-intercalation material, for example hard carbon, versus graphite. One embodiment of the present negative electrode has the following configuration:

hard carbon/current collector/lithium/current collector/
      hard carbon.

With this double current collector electrode design, the amount of lithium metal is adjusted to precisely compensate for the irreversible capacity of the hard carbon. Upon activating the cell with an ion-conductive electrolyte, the alkali metal migrates into the hard carbon resulting in complete consumption of the alkali metal. The absence of the alkali metal in the cell preserves the desirable safety and cycling properties of the intercalation negative and positive electrodes. Therefore, the present negative electrode preferably having lithium metal sandwiched between two current collectors which are further sandwiched between two hard carbon structures has a significantly higher volumetric and/or gravimetric energy density than a conventional negative electrode of a carbonaceous material contacted to a single current collector.

Regardless of the carbonaceous nature or makeup of the anode material, fibers are particularly advantageous. Fibers have excellent mechanical properties which permit them to be fabricated into rigid electrode structures that are capable of withstanding degradation during repeated charge/discharge cycling. Moreover, the high surface area of carbon fibers allows for rapid charge/discharge rates.

The carbonaceous portion of the present negative electrode for a secondary cell is fabricated by mixing about 90 to 97 weight percent of the anode material, preferably hard carbon, with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof.

This negative electrode admixture is provided on a current collector such as of a copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloy foil or screen by casting, pressing, rolling or otherwise contacting the admixture thereto.

Another type of anode material useful with the present invention is a metal which can reversibly alloy with alkali metals. Such metals include, but are not limited to, Sn, Si, Al, Pb, Zn, and Ag. These alloying metals demonstrate very high reversible capacities, but suffer from poor cycling properties because of massive dimensional changes during the alloying process. One approach which has been used to solve this problem is to suspend nano-sized particles of them in a matrix of inactive material. The inactive material is typically generated by reduction of an oxide of the alloying metal during the first cycle. Examples of oxides include but are not limited to SnO, $SnO_2$, SiO, and $SnO(B_2O_3)_x(P_2O_5)_y$. These oxides exhibit good cycling properties and high reversible capacities, but reduction of the metal oxide consumes large amounts of alkali metal during the first charge. Thus, in conventional secondary chemistries, additional cathode active material must be incorporated into the cell to compensate for this reduction, thereby reducing cell capacity.

It is, therefore, another preferred embodiment of the present invention to place a piece of alkali metal between the above metal oxide anode materials. The amount of alkali metal is chosen to precisely compensate for the reduction of the metal oxide. Then, upon activating the cell with an ion-conductive electrolyte, the alkali metal migrates into the anode material resulting in complete consumption of the alkali metal. As before, the absence of alkali metal in the cell preserves the desirable safety and cycling properties of the anode material, and the resulting cell has capacity which exceeds that of the current art.

Still another preferred embodiment of the present invention takes advantage of active materials that are typically used as cathode active materials in primary cells, but which can not normally be used in conventional secondary cells. The current art in rechargeable cells typically uses the positive electrode as the source of alkali metal ions. This prohibits the use of metal-containing cathode active materials which do not contain alkali metal ions. Examples of such metal-containing materials include $V_2O_5$, SVO, CSVO, $MnO_2$, $TiS_2$, $CuO_2$, $Cu_2S$, FeS, $FeS_2$, $CF_x$, $Ag_2O$, $Ag_2O_2$, CuF, $Ag_2CrO_4$, copper oxide, copper vanadium oxide, and mixtures thereof. The use of these active materials in the positive electrode of a secondary cell normally requires the presence of an alkali metal anode or a pre-metalated anode material (most desirably carbon). The use of an alkali metal anode is undesirable because of the previously discussed poor cycling and safety properties of these materials. Pre-metalated carbon materials are known in the art, but have never been commercialized because of difficulties in reliably manufacturing them.

In the present invention, a piece of alkali metal is used in conjunction with one or more of the previously described metal-containing materials which are typically used as cathode active materials in primary cells. In the present invention, the piece of alkali metal serves as the source of alkali metal ions and is sandwiched between two layers of one or more of the above metal-containing materials now serving as an anode material. The amount of alkali metal is chosen such that it precisely compensates for the reversible capacity of the anode material. Upon activating the cell with an ion-conductive electrolyte, the alkali metal migrates into the anode material resulting in complete consumption of the alkali metal, which preserves the desirable safety and cycling properties of the anode material.

Now, it is possible for the positive electrode to have as its active material any of the above materials which are described as useful anode materials for the negative electrode of the present invention and which form an acceptable electrochemical potential with the anode material. As previously described, these materials are not typically used as cathode active materials in secondary cells because they are not lithiated. An exemplary couple would be graphite/Li as a negative electrode and $V_2O_5$ or SVO as a positive electrode.

As is the case with the above described carbonaceous anode materials, the alloying anode metals and the metal-containing anode materials are formed into a sandwich electrode body for incorporation into an electrochemical cell by mixing one or more of them with one of the above described binder materials. Further, up to about 10 weight percent of a conductive diluent is preferably added to the mixture to improve conductivity. Suitable materials for this purpose include acetylene black, carbon black and/or graphite or a metallic powder such as powdered nickel, aluminum, titanium and stainless steel. The preferred anode material mixture thus includes a powdered fluoro-polymer binder present at about 1 to 5 weight percent, a conductive diluent present at about 1 to 5 weight percent and about 90 to 98 weight percent of the anode material.

Therefore, one exemplary negative electrode has an anode material short circuited to the alkali metal anode active material by parallel connection through the current collectors. The following configuration is exemplary:

first anode material/current collector/alkali metal/current collector/second anode material, wherein the first and second anode materials are either the same or different.

Another embodiment of the present invention has the alkali metal sandwiched between the anode material, in which the anode material is short circuited to the alkali metal by direct contact. This negative electrode has the configuration:

first anode material/current collector/second anode material/alkali metal/third anode material/current collector/fourth anode material, wherein the first, second, third and fourth anode materials are either the same or different.

A third exemplary embodiment of the present invention has the configuration:
   anode material/current collector/alkali metal, wherein the anode material faces the positive electrode.

More preferred embodiments include the following negative electrode configurations:
   hard carbon/current collector/lithium/current collector/hard carbon, or
   anode material/current collector/lithium/current collector/anode material, wherein the anode material is selected from the group consisting of SnO, $SnO_2$, SiO, SnO $(B_2O_3)_x(P_2O_5)_y$, $V_2O_5$, SVO, CSVO, $MnO_2$, $TiS_2$, $CuO_2$, $Cu_2S$, FeS, $FeS_2$, $CF_x$, $Ag_2O$, $Ag_2O_2$, CuF, $Ag_2CrO_4$, copper oxide, copper vanadium oxide, and mixtures thereof, or
   carbonaceous material/current collector/lithium/current collector/carbonaceous material, or
   graphite/current collector/graphite/lithium/graphite/current collector/graphite.

In a secondary cell, the reaction at the positive electrode involves conversion of ions which migrate from the negative electrode to the positive electrode into atomic or molecular forms. The positive electrode preferably comprises lithiated oxides, sulfides, selenides, and tellurides of such metals as vanadium, titanium, chromium, copper, molybdenum, niobium, iron, nickel, cobalt and manganese. Preferred lithiated oxides include $Li_xTi_5O_{12}$ (x=4 to 7), $Li_{3-x}M_xN$ (M=Co, Ni; x=0.1 to 0.6), $LiNiO_2$, $LiMn_2O_4$, $LiMnO_2$, $LiV_2O_5$, $LiCoO_2$, $LiCo_{0.92}Sn_{0.08}O_2$ and $LiCo_{1-x}Ni_xO_2$. The above-described alkali metal intercalation and de-intercalation materials such as SVO, CSVO, $Ag_2O$, $Ag_2O_2$, $CuF_2$, $Ag_2CrO_4$, $MnO_2$, $V_2O_5$, $TiS_2$, $Cu_2S$, FeS, $FeS_2$, copper oxide, copper vanadium oxide, and mixtures thereof, are also useful as cathode active materials.

To charge such secondary cells, the lithium ions comprising the positive electrode are intercalated into the carbonaceous anode material or the lithium intercalation and de-intercalation anode material of the negative electrode by applying an externally generated electrical potential to the cell. The applied recharging potential draws the lithium ions from the cathode active material, through the electrolyte and into the anode material to saturate it. In the case of carbon, the resulting $Li_xC_6$ material can have an x ranging between 0.1 and 1.0. The cell is then provided with an electrical potential and discharged in a normal manner.

The above described cathode active materials are formed into a positive electrode by mixing them with one or more of the above described binder materials and conductive diluents. The preferred cathode active mixture thus includes a powdered fluoro-polymer binder present at about 1 to 5 weight percent, a conductive diluent present at about 1 to 5 weight percent and about 90 to 98 weight percent of the cathode active material.

Positive electrodes for incorporation into an electrochemical cell according to the present invention may be prepared by rolling, spreading or pressing the cathode active formulations onto a suitable current collector of any one of the previously described materials suitable for the negative electrode. The preferred current collector material is aluminum. Positive electrodes prepared as described above may be in the form of one or more plates operatively associated with at least one or more plates of a negative electrode, or in the form of a strip wound with a corresponding strip of the negative electrode in a structure similar to a "jellyroll".

In order to prevent internal short circuit conditions, the negative electrode is separated from the positive electrode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the negative and positive electrodes during electrochemical reactions of the cell. A suitable electrolyte has an inorganic, tonically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode active material.

In the case of an anode active material comprising lithium, the alkali metal salt of the electrolyte is a lithium based salt. Known lithium salts that are useful as a vehicle for transport of alkali metal ions between the negative electrode and the positive electrode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LISCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

A preferred electrolyte for a secondary cell according to the present invention comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the secondary cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of the exemplary secondary cell of the present invention. As is well known to those skilled in the art, the present secondary electrochemical systems can also be constructed in case-positive configuration.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
    a) a negative electrode comprising an alkali metal positioned between first and second current collectors, wherein a first anode material contacts the opposite side of the first current collector and a second anode material contacts the opposite side of the second current collector;
    b) a positive electrode of a cathode active material; and
    c) a nonaqueous electrolyte activating the negative electrode and the positive electrode, wherein upon cell activation with the electrolyte, the alkali metal is completely consumed through migration and intercalation into the first and second anode materials.

2. The electrochemical cell of claim 1 wherein the first and second anode material are selected from the group consisting of a carbonaceous material, SnO, $SnO_2$, SiO, tin-boron-phosphorous oxide, $V_2O_5$, silver vanadium oxide, copper silver vanadium oxide, $MnO_2$, $TiS_2$, $CuO_2$, $Cu_2S$, FeS, $FeS_2$, $CF_x$, $Ag_2O$, $Ag_2O_2$, CuF, $Ag_2CrO_4$, copper oxide, copper vanadium oxide, and mixtures thereof.

3. The electrochemical cell of claim 2 wherein the carbonaceous material is selected from the group consisting of coke, graphite, acetylene black, carbon black, glassy carbon, hairy carbon, non-graphitizable carbon, and mixtures thereof.

4. The electrochemical cell of claim 1 wherein the negative electrode has the configuration: first anode material/first current collector/alkali metal/second current collector/second anode material; wherein the first and second anode materials are capable of intercalating and de-intercalating the alkali metal and are the same or different.

5. The electrochemical cell of claim 1 wherein the negative electrode has the configuration: first anode material/first current collector/third anode material/alkali metal/fourth anode material/second current collector/second anode material, wherein the first, second, third and fourth anode materials are capable of intercalating and de-intercalating the alkali metal and are either the same or different.

6. The electrochemical cell of claim 1 wherein the first and second anode materials are non-graphitizable carbon and the negative electrode has the configuration: non-graphitizable carbon/first current collector/lithium/second current collector/non-graphitizable carbon.

7. The electrochemical cell of claim 1 wherein the anode materials are non-graphitizable carbon and the negative electrode has the configuration: non-graphitizable carbon/first current collector/non-graphitizable carbon/lithium/non-graphitizable carbon/second current collector/non-graphitizable carbon.

8. The electrochemical cell of claim 1 wherein the first and second anode materials are of a carbonaceous material and the negative electrode has the configuration: carbonaceous material/first current collector/lithium/second current collector/carbonaceous material.

9. The electrochemical cell of claim 1 wherein the cathode active material is selected from the group consisting of $Li_xTi_5O_{12}$ (x=4 to 7), $Li_{3-x}M_xN$ (M=Co, Ni; x=0.1 to 0.6), $LiNiO_2$, $LiMn_2O_4$, $LiMnO_2$, $LiV_2O_5$, $LiCoO_2$, $LiCo_{0.92}Sn_{0.08}O_2$, lithium cobalt nickel oxide, silver vanadium oxide, copper silver vanadium oxide, $V_2O_5$, $NnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

10. The electrochemical cell of claim 1 wherein the positive electrode includes non-active materials selected from a binder material and a conductive additive.

11. The electrochemical cell of claim 10 wherein the binder material is a fluoro-resin powder.

12. The electrochemical cell of claim 10 wherein the conductive additive is selected from the group consisting of carbon, graphite powder, acetylene black, titanium powder, aluminum powder, nickel powder, stainless steel powder, and mixtures thereof.

13. An electrochemical cell, which comprises:
    a) a positive electrode of a cathode active material;
    b) a negative electrode of an alkali metal, having spaced apart first and second major sides positioned between first and second current collectors, wherein a first anode material contacts the opposite side of the first current collector and a second anode material contacts the opposite side of the second current collector, and wherein the first and second anode materials are capable of intercalating and de-intercalating the alkali metal; and c) a nonaqueous electrolyte activating the negative electrode and the positive electrode, wherein upon cell activation with the electrolyte, the alkali metal is completely consumed through migration and intercalation into the first and second anode materials.

14. The electrochemical cell of claim 13 wherein the negative electrode has the configuration: first anode material/first current collector/alkali metal/second current collector/second anode material, wherein the first and second anode materials are capable of intercalating and de-intercalating the alkali metal and are the same or different.

15. The electrochemical cell of claim 13 wherein at least one of the first and second anode materials is a carbonaceous material and the negative electrode has the configuration: carbonaceous material/first current collector/lithium/second current collector/second anode material.

16. The electrochemical cell of claim 13 wherein at least one of the first and second anode materials is non-graphitizable carbon and the negative electrode has the configuration: non-graphitizable carbon/first current collector/lithium/second current collector/second anode material.

17. The electrochemical cell of claim 13 wherein the first and second current collectors are selected from the group consisting of copper, stainless steel, titanium, tantalum, platinum, gold, aluminum, cobalt nickel alloys, highly alloyed ferritic stainless steel containing molybdenum and chromium, and nickel-, chromium-, and molybdenum-containing alloy.

18. The electrochemical cell of claim 13 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

19. The electrochemical cell of claim 18 wherein the first solvent is selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, $\gamma$-valerolactone, $\gamma$-butyrolactone, N-methyl-pyrrolidinone, and mixtures thereof.

20. The electrochemical cell of claim 13 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

21. The electrochemical cell of claim 13 wherein the electrolyte is of a lithium salt dissolved in a mixture of ethylene carbonate, dimethyl carbonate, ethyl methyl carbonate and diethyl carbonate.

22. An electrochemical cell, which comprises:

a) a positive electrode of a cathode active material;

b) a negative electrode of an alkali metal sandwiched between a first and second current collectors with an anode material selected from the group consisting of SnO, $SnO_2$, SiO, tin-boron-phosphorous oxide, a carbonaceous material, $V_2O_5$, silver vanadium oxide, copper silver vanadium oxide, $MnO_2$, $TiS_2$, $CuO_2$, $Cu_2S$, FeS, $FeS_2$, $CF_x$, $Ag_2O$, $Ag_2O_2$, CuF, $Ag_2CrO_4$, copper oxide, copper vanadium oxide, and mixtures thereof, contacted to at least one of the first and second current collectors opposite the alkali metal and facing the positive electrode; and c) a nonaqueous electrolyte activating the negative electrode and the positive electrode.

23. A method for providing an electrochemical cell, comprising the steps of:

a) providing a positive electrode of a cathode active material capable of intercalating and deintercalating an alkali metal;

b) providing a negative electrode comprising the alkali metal positioned between first and second current collectors, wherein a first anode material contacts the opposite side of the first current collector and a second anode material contacts the opposite side of the second current collector; and c) activating the negative electrode and the positive electrode with a nonaqueous electrolyte, wherein upon cell activation with the electrolyte, the alkali metal is completely consumed through migration and intercalation into the first and second anode materials.

24. The method of claim 23 including providing the negative electrode having the configuration: first anode material/first current collector/alkali metal/second current: collector/second anode material, wherein the first and second anode materials are capable of intercalating and de-intercalating the alkali metal and are the same or different.

25. The method of claim 23 including providing the negative electrode having the configuration: first anode material/first current collector/third anode material/alkali metal/fourth anode material/second current collector/second anode material, wherein the first, second, third and fourth anode materials are capable of intercalating and de-intercalating the alkali metal and are either the same or different.

26. The method of claim 23 including providing at least one of the first and second anode materials as non-graphitizable carbon with the negative electrode having the configuration: non-graphitizable carbon/first current collector/lithium/second current collector/second anode material.

27. The method of claim 23 including providing at least one of the first and second anode materials as a carbonaceous material with the negative electrode having the configuration: carbonaceous material/first current collector/lithium/second current collector/second anode material.

28. The method of claim 23 including selecting the first and second anode materials from the group consisting of SnO, $SnO_2$, SiO, tin-boron-phosphorous oxide, a carbonaceous material, $V_2O_5$, silver vanadium oxide, copper silver vanadium oxide, $MnO_2$, $TiS_2$, $CuO_2$, $Cu_2S$, FeS, $FeS_2$, $CF_x$, $Ag_2O$, $Ag_2O_2$, CuF, $Ag_2CrO_4$, copper oxide, copper vanadium oxide, and mixtures thereof.

29. The method of claim 28 including selecting the carbonaceous material from the group consisting of coke, graphite, acetylene black, carbon black, glassy carbon, hairy carbon, hard carbon, and mixtures thereof.

* * * * *

UNITED STATES PATENT AND TRADEMARK OFFICE
CERTIFICATE OF CORRECTION

PATENT NO. : 6,737,191 B2
DATED : May 18, 2004
INVENTOR(S) : Hong Gan et al.

It is certified that error appears in the above-identified patent and that said Letters Patent is hereby corrected as shown below:

Column 6,
Line 40, "LISCN" should read -- LiSCN --;

Column 8,
Line 50, "NnO$_2$" should read -- MnO$_2$ --;
Line 66, after "metal" please delete ",";

Column 9,
Line 46, "1-ethoxy, 2-methoxyethane" should read -- 1-ethoxy,2-methoxyethane --; and Column 10,
Line 58, "V$_{205}$" should read -- V$_2$O$_5$ --.

Signed and Sealed this

Thirtieth Day of November, 2004

JON W. DUDAS
*Director of the United States Patent and Trademark Office*